United States Patent [19]

Brunnhofer

[11] Patent Number: 5,390,705
[45] Date of Patent: Feb. 21, 1995

[54] COLD-RESISTANT FUEL-LINE HOSE

[75] Inventor: Erwin Brunnhofer, Guxhagen, Germany

[73] Assignee: Technoflow Tube-Systems GmbH, Fuldabruck, Germany

[21] Appl. No.: 9,455

[22] Filed: Jan. 27, 1993

[30] Foreign Application Priority Data

Jan. 29, 1992 [DE] Germany ............................. 4202397

[51] Int. Cl.$^6$ ............................................. F16L 11/00
[52] U.S. Cl. .................................... 138/137; 138/103; 138/141; 138/177; 264/209.1
[58] Field of Search ............... 138/103, 118, 137, 141, 138/177, 125, 126; 264/209.1, 173, 241; 156/287

[56] References Cited

U.S. PATENT DOCUMENTS

| | | | |
|---|---|---|---|
| 2,053,140 | 9/1936 | Exton | 138/137 |
| 2,932,323 | 4/1960 | Aries | 138/137 |
| 2,971,538 | 2/1961 | Brumbach | 138/137 |
| 3,561,493 | 2/1971 | Maillard et al. | 138/137 |
| 3,618,614 | 11/1971 | Flynn | 138/137 |
| 3,762,986 | 10/1973 | Bhuta et al. | 138/137 |
| 4,136,715 | 1/1979 | McCormack et al. | 138/141 |
| 4,196,464 | 4/1980 | Russell | 138/137 |
| 4,303,457 | 12/1981 | Johansen et al. | 138/137 |
| 4,424,834 | 1/1984 | Sumi et al. | 138/137 |
| 4,474,217 | 10/1984 | DeMorse et al. | 138/141 |
| 4,614,208 | 9/1986 | Skarelius | 138/103 |
| 4,791,965 | 12/1988 | Wynn | 138/137 |
| 5,038,833 | 8/1991 | Brunnhofer | 138/137 |
| 5,052,444 | 10/1991 | Messerly et al. | 138/137 |
| 5,154,357 | 10/1992 | Jamison et al. | 138/137 |
| 5,219,003 | 6/1993 | Kerschbaumer | 138/137 |

FOREIGN PATENT DOCUMENTS 0159723 12/1979 Japan ................................. 138/137

OTHER PUBLICATIONS

"Plastics-Determination of Izod Impact Strength of Rigid Materials" Draft Intern. Standard ISO/DIS 180, Int. Org. for Standardization 1991.

Primary Examiner—James E. Bryant, III
Attorney, Agent, or Firm—Herbert Dubno; Andrew Wilford

[57] ABSTRACT

A layered tubing for use in a motor vehicle has a thick tubular inner layer formed of a synthetic resin having a predetermined hardness and a predetermined thickness and a thin tubular outer relax layer bonded externally to and surrounding the inner layer. This outer layer is formed of a synthetic resin having a hardness equal to at most 0.8 of the hardness of the inner layer and a thickness equal to at most 0.5 of the thickness of the inner layer. The inner layer can be one layer or can be formed of a plurality of coextruded and coaxial sublayers.

7 Claims, 1 Drawing Sheet

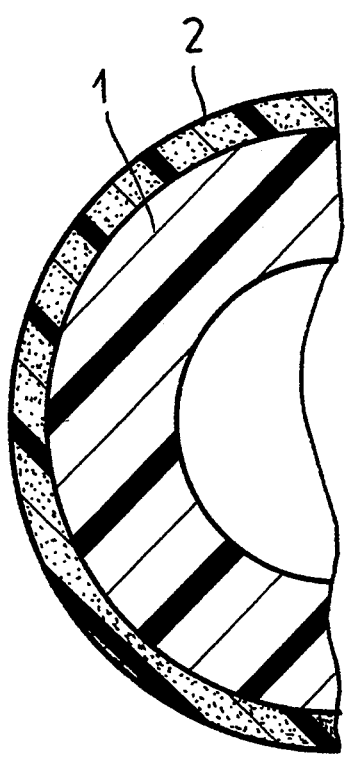
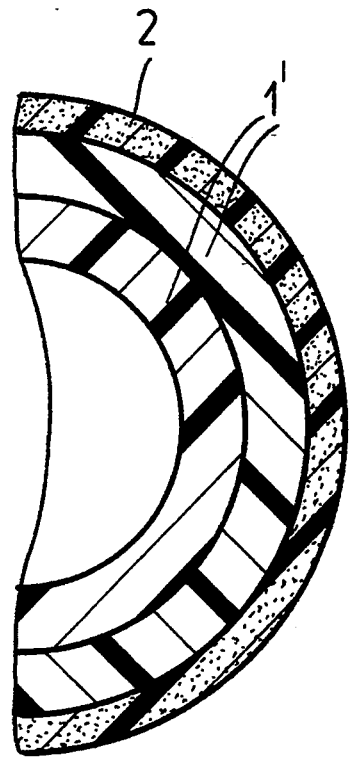
FIG.1  FIG.2
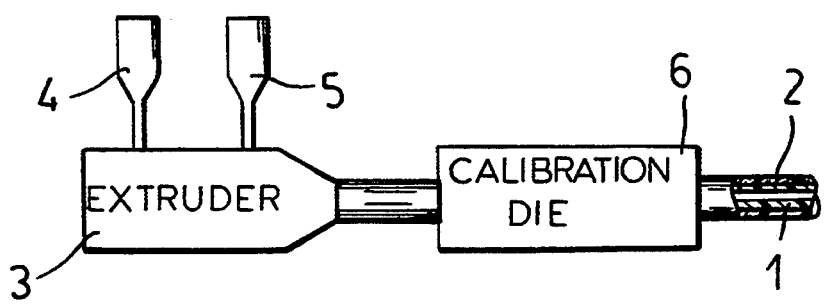
FIG.3

COLD-RESISTANT FUEL-LINE HOSE

FIELD OF THE INVENTION

The present invention relates to tubing or hose used in a motor vehicle. More particularly this invention concerns a fuel-line hose made of a synthetic resin and method of making same.

BACKGROUND OF THE INVENTION

Tubing used in a motor vehicle as a fuel line, brake line, vacuum line, coolant hose, or the like is typically made of one or more layers of synthetic resin as a fairly stiff tubing or hose. It is designed to have certain predetermined characteristics —hardness, strength, elongation on break, notch impact strength—and can generally be counted on to give good service down to about −40° C. These characteristics are typically determined by selection of the resin making a one-layer tube or the resins in a multilayer one. Reference should be made to U.S. Pat. Nos. 5,076,329 and 5,167,259 as well as to German patent documents 3,715,251 and 3,821,723, all of E. Brunnhofer, for further details.

Typically the last stage of manufacture of such a hose or tube is a calibration step where the tubing moves through a cold vacuum-calibrating die to set its outside diameter to the exact desired size. This step has the side effect of orienting the outer layer of the tube, that is that portion of the tube that is directly contacted by the calibrating die. This unfortunately results in an outer layer that is excessively sensitive to cold. Thus when used in extremely frigid surroundings, about −40° C., the hose is subject to cracking.

Thus it has been proposed in European patent application 87 400 666 filed by J. Labalg (based on a French priority of Apr. 4, 1986) to eliminate the orientation of the outer layers of the tube by flame treating the tube. Thus the finished calibrated tube is passed quickly through a flame to heat its outer surface sufficiently to relax any stresses created therein by the calibrating step without softening it enough to actually change its diameter or shape.

Such an additional step is clearly another manufacturing cost that must be added to the cost of making the tube. In addition it is fairly difficult to get the flame-relaxing just right, as too much heat deforms the tube or changes its chemical composition while not enough leaves unwanted stresses in its outer surface.

OBJECTS OF THE INVENTION

It is therefore an object of the present invention to provide an improved cold-resistant hose.

Another object is the provision of such an improved cold-resistant hose which overcomes the above-given disadvantages, that is which is resistant to extreme cold temperatures of −40° C. and below and that is simple and inexpensive to manufacture.

A further object is to provide an improved method of making such tubing.

SUMMARY OF THE INVENTION

A layered tubing for use in a motor vehicle has a thick tubular inner layer formed of a synthetic resin having a predetermined hardness and a predetermined thickness, and a thin tubular outer relax layer bonded externally to and surrounding the inner layer. According to the invention this outer layer is formed of a synthetic resin having a hardness equal to at most 0.8 of the hardness of the inner layer and a thickness equal to at most 0.5 of the thickness of the inner layer. The inner layer can be one layer or can be formed of a plurality of coextruded and coaxial sublayers.

This tubing is particularly usable as a fuel line and as mentioned above the inner layer can be constructed in accordance with the above-cited patent documents. The softer outer resin will not be oriented by the calibration step, however, so no extra step will be needed to eliminate this orientation. Nonetheless the tubing can be manufactured to the exact outside diameter needed, so that the clamps and fittings will work perfectly. The outer layer protects the inner layer which itself resists the contents of the tube, typically hydrocarbons, alcohol, and water in motor-vehicle fuel.

In accordance with this invention the inner-layer resin is nylon 6, nylon 66, nylon 46, nylon 69, nylon 610, nylon 612, nylon 6-3T, nylon 11, or nylon 12 as described in part 1 of DIN 16,773, a polypropylene as described in DIN 16,774, a polyethylene terephthalate or polybutylene terephthalate as described in DIN 16,779, a TEEE polyester elastomer as described in ASTM D 1972, or a mixture thereof. In addition this inner-layer resin has a Shore D hardness between 30 and 85 (determined in accordance with DIN 53505), a strength between 10 N/mm$^3$ and 60 N/mm$^3$ (determined in accordance with DIN 53455), an elongation on break of between 30% and 600% (determined in accordance with DIN 53455), and a notch impact strength at −40° C. of 2 kJ/m$^2$ (determined in accordance with ISO 180/1A).

The outer-layer resin according to the invention is nylon 6, nylon 66, nylon 46, nylon 69, nylon 610, nylon 612, nylon 6-3T, nylon 11, nylon 12, a polypropylene, a polyethylene terephthalate or polybutylene terephthalate, a TEEE Polyester elastomer, or a mixture thereof, as defined in the above DIN and ASTM standards.

The tubing outer-layer thickness is between 0.1 mm and 0.2 mm and the overall tubing wall thickness, including inner and outer layers, is between 0.5 mm and 4 mm.

BRIEF DESCRIPTION OF THE DRAWING

The above and other objects, features, and advantages will become more readily apparent from the following, reference being made to the accompanying drawing in which:

FIGS. 1 and 2 are cross sections through tubes according to the invention; and

FIG. 3 is a small-scale diagrammatic view illustrating the method of this invention.

SPECIFIC DESCRIPTION

As seen in FIG. 1 a hose is of cylindrical shape and comprises a relatively thick inner layer 1 and a relatively thin outer layer 2. In FIG. 2, two sublayers 1' take the place of the inner layer of FIG. 1. The outer layer 2 is substantially thinner and substantially softer than the inner layer 1 or combined inner sublayers 1'. The resins that can constitute these layers include nylon 6, nylon 66, nylon 46, nylon 69, nylon 610, nylon 612, nylon 6-3T, nylon, 11, or nylon 12 as described in part 1 of DIN 16,773, a polypropylene as described in DIN 16,774, a polyethylene terephthalate or polybutylene terephthalate as described in DIN 16,779, a TEEE polyester elastomer as described in ASTM D 1972, or a mixture thereof. In addition this inner-layer resin has a Shore D hardness between 30 and 85, a strength between 10 N/mm³ and 60 N/mm³, an elongation on break of between 30% and 600%, and a notch impact strength at −40° C. of 2 kJ/m².

The tubing 1, 2 thus formed has a wall thickness measured radially of between 0.5 mm and 4 mm and the outer layer 2 has a thickness measured radially of between 0.1 mm and 0.2 mm.

FIG. 3 shows how an extruder 3 fed from a pair of resin supplies 4 and 5 for the respective layers 1 and 2 produces the tube 1, 2 which is then forced through an extrusion die 6. Thus the hose according to the invention is produced continuously.

I claim:

1. A layered tubing for use in a motor vehicle, the tubing comprising:
   a thick tubular inner layer formed of a synthetic resin having a predetermined hardness and a predetermined thickness; and
   a thin coextruded tubular outer relax layer bonded externally to and surrounding the inner layer and formed of a synthetic resin having a hardness equal to at most 0.8 of the hardness of the inner layer and a thickness equal to at most 0.5 of the thickness of the inner layer and between 0.1 mm and 0.2 mm.

2. The tubing defined in claim 1 wherein the inner layer is formed of a plurality of coextruded and coaxial sublayers.

3. The tubing defined in claim 1 wherein the inner layer resin is nylon 6, nylon 66, nylon 46, nylon 69, nylon 610, nylon 612, nylon 6-3T, nylon 11, nylon 12, a polypropylene, a polyethylene terephthalate or polybutylene terephthalate, a TEEE polyester elastomer, or a mixture thereof.

4. The tubing defined in claim 1 wherein the tubing has a wall thickness of between 0.5 mm and 4 mm.

5. The tubing defined in claim 1 wherein the inner-layer resin has
   a Shore D hardness between 30 and 85,
   a strength between 10 N/mm³ and 60 N/mm³,
   an elongation on break of between 30% and 600%, and
   a notch impact strength at −40° C. of 2 kJ/m².

6. The tubing defined in claim 1 wherein the outer-layer resin is nylon 6, nylon 66, nylon 46, nylon 69, nylon 610, nylon 612, nylon 6-3T, nylon 11, nylon 12, a polypropylene, a PBT polyethylene terephthalate, a TEEE Polyester elastomer, or a mixture thereof.

7. A method of making a layered tubing for use in a motor vehicle, the method comprising the steps of:
   coextruding a tube consisting of
      a thick tubular inner layer formed of a synthetic resin having a predetermined hardness and a predetermined thickness and
      a thin tubular outer relax layer bonded externally to and surrounding the inner layer and formed of a synthetic resin having a hardness equal to at most 0.8 of the hardness of the inner layer and a thickness equal to at most 0.5 of the thickness of the inner layer and between 0.1 mm and 0.2 mm; and
   calibrating the tubing by passing the tubing through a calibration die to impart to the tubing a predetermined outside diameter.

* * * * *